US009940688B2

(12) United States Patent
Alshinnawi et al.

(10) Patent No.: US 9,940,688 B2
(45) Date of Patent: Apr. 10, 2018

(54) VIDEO ADAPTER ALIGNMENT

(71) Applicant: Lenovo Enterprise Solutions (Singapore) Pte. Ltd., Singapore (SG)

(72) Inventors: Shareef F. Alshinnawi, Apex, NC (US); Gary D. Cudak, Wake Forest, NC (US); Samuel Fanchiang, Taipei (TW); Edward S. Suffern, Chapel Hill, NC (US); John M. Weber, Wake Forest, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 25 days.

(21) Appl. No.: 14/730,313

(22) Filed: Jun. 4, 2015

(65) Prior Publication Data

US 2016/0358301 A1 Dec. 8, 2016

(51) Int. Cl.
| | |
|---|---|
| *G06T 17/00* | (2006.01) |
| *G06T 1/20* | (2006.01) |
| *G09G 5/391* | (2006.01) |

(52) U.S. Cl.
CPC .............. *G06T 1/20* (2013.01); *G09G 5/391* (2013.01); *G09G 2340/0435* (2013.01); *G09G 2360/08* (2013.01); *G09G 2360/121* (2013.01); *G09G 2370/042* (2013.01); *G09G 2370/22* (2013.01)

(58) Field of Classification Search
CPC ................................ G06T 17/20; G06T 15/00
USPC ......................................................... 345/428
See application file for complete search history.

(56) References Cited

U.S. PATENT DOCUMENTS

| | | | |
|---|---|---|---|
| 7,123,248 B1* | 10/2006 | Lafleur .................. | G09G 5/006 345/204 |
| 7,698,579 B2 | 4/2010 | Hendry et al. | |
| 8,203,563 B2 | 6/2012 | Herz et al. | |
| 8,243,082 B1* | 8/2012 | Wyatt .................. | G06F 3/1438 345/502 |
| 8,558,839 B1* | 10/2013 | Wyatt ...................... | G06F 3/14 345/501 |
| 2003/0131178 A1* | 7/2003 | Huang ...................... | G06F 3/14 710/315 |
| 2004/0230705 A1* | 11/2004 | Maciesowicz ............ | G06F 3/14 710/1 |
| 2005/0237327 A1* | 10/2005 | Rubinstein ................ | G06F 3/14 345/519 |
| 2007/0076006 A1* | 4/2007 | Knepper ................... | G06F 3/14 345/520 |

(Continued)

*Primary Examiner* — Jin Ge
(74) *Attorney, Agent, or Firm* — Lieberman & Brandsdorfer, LLC

(57) ABSTRACT

The embodiments relate to a computer system, and management of an operating mode of a general-purpose computing on graphics processing unit (GPGPU) adapter. A tool is provided to control the function of the GPGPU adapter. The tool includes an input/output (I/O) interface operatively coupled to the GPGPU adapter. The tool further includes basic input/output system (BIOS) to determine presence of the GPGPU adapter and to interrogate the GPGPU adapter to automatically set an operating mode of the GPGPU adapter. At least two modes of the GPGPU adapter are provided. The GPGPU adapter is set to a first mode in response to determining that the GPGPU adapter is in communication with the visual display, and set to the second mode in response to determining that the GPGPU is not in communication with a visual display.

20 Claims, 2 Drawing Sheets

(56) References Cited

U.S. PATENT DOCUMENTS

| | | | |
|---|---|---|---|
| 2008/0034238 A1* | 2/2008 | Hendry | G06F 1/3203 713/323 |
| 2008/0158236 A1* | 7/2008 | Bakalash | G06T 15/005 345/506 |
| 2009/0027402 A1* | 1/2009 | Bakalash | G06F 9/5044 345/505 |
| 2011/0169844 A1* | 7/2011 | Diard | G06F 9/455 345/522 |
| 2011/0267359 A1 | 11/2011 | Redman et al. | |

* cited by examiner

VIDEO ADAPTER ALIGNMENT

BACKGROUND

The embodiments described herein relate to aligning a video adapter in association with its functionality. More specifically, the embodiments relate to managing an operating mode of a general-purpose computing on graphics processing unit (GPGPU) adapter.

A graphics processing unit (GPU) is an electronic circuit that is designed to accelerate the creation of images in a frame buffer intended for output to a visual display. GPUs are found and used in many computing devices including, but not limited to, personal computers, gaming consoles, mobile phones, workstations, embedded systems, etc. In the case of a personal computer, a GPU may be present on a video adapter. A video adapter, also known in the art as a video card, a graphics card, a graphics board, a graphics adapter, etc., is a device that is connected to the motherboard of the personal computer and interfaces with a visual display in order to output an image feed to the visual display.

Video adapters are connected to the motherboard by means of a motherboard interface (e.g., a computer bus). One example of a computer bus is a Peripheral Component Interconnect, or PCI. Such PCIs include conventional PCI (PCI), PCI Extended (PCI-X), and PCI Express (PCIe). PCI and PCI-X are sometimes referred to as "Parallel PCI," in contrast to the more modern PCIe, which uses a serial, lane-based architecture. Video adapters may be connected to the visual display by means of an output interface. Types of output interfaces include, but are not limited to, Video Graphics Array (VGA), High-Definition Multimedia Interface (HDMI), DisplayPort, Digital Visual Interface (DVI), Separate Video (S-Video), Composite Video, and Component Video.

SUMMARY

The aspects described herein comprise a system, a method, and a computer program product for controlling the function of a GPGPU adapter.

According to one aspect, a system is provided for managing an operating mode of a GPGPU adapter. The system includes a computer system. The computer system includes a processing unit operatively coupled to memory, a video device for outputting video data, and a basic input/output system (BIOS). The system further includes a GPGPU adapter, a video display, and a tool in communication with the processing unit to control the function of the GPGPU adapter. The tool includes an input/output (I/O) interface. The processing unit is operatively coupled to the I/O interface. The GPGPU adapter and the visual display are in communication with the I/O interface, with the GPGPU adapter in communication with the I/O interface via a communication bus. The tool further includes BIOS to determine presence of the GPGPU adapter. More specifically, the BIOS is configured to interrogate the GPGPU adapter, and automatically set an operating mode of the GPGPU adapter based on data gathered from the interrogation. The modes of the GPGPU adapter include a first mode and a second mode. Interrogation includes determining that the GPGPU adapter is in communication with the visual display. The GPGPU adapter is set to the first mode in response to determining that the GPGPU adapter is in communication with the visual display. The GPGPU adapter is automatically set to the second mode if the adapter is not in communication with the visual display.

According to another aspect, a method is provided for managing an operating mode of a GPGPU adapter. The BIOS determines presence of a GPGPU adapter. The GPGPU adapter is interrogated to determine if the GPGPU adapter is in communication with a visual display. An operating mode of the GPGPU adapter is automatically set in response to the interrogation. The mode of the GPGPU adapter includes a first mode and a second mode. The GPGPU adapter is set to the first mode in response to determining that the GPGPU adapter is in communication with the visual display. The GPGPU adapter is automatically set to the second mode if the adapter is not in communication with the visual display.

According to yet another aspect, a computer program product is provided to control a function of a GPGPU adapter. The computer program product includes a computer readable storage device having program code embodied therewith. The program code is executable by a processing unit to determine presence of a GPGPU adapter. Once the presence of the GPGPU adapter is confirmed, the GPGPU adapter is interrogated, including determining if the GPGPU adapter is in communication with a visual display. An operating mode of the GPGPU adapter is automatically set in response to the interrogation. The mode of the GPGPU adapter includes a first mode and a second mode. The GPGPU adapter is set to the first mode in response to determining that the adapter is in communication with the visual display. The GPGPU adapter is automatically set to the second mode if the adapter is not in communication with the visual display.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments unless otherwise explicitly indicated.

DETAILED DESCRIPTION

It will be readily understood that the components of the embodiments, as generally described and illustrated in the Figures herein, may be arranged and designed in a wide variety of different configurations. Thus, the following detailed description of the embodiments of the system and the method, as presented in the Figures, is not intended to limit the scope of the embodiments, as claimed, but is merely representative of the selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Figure 1:
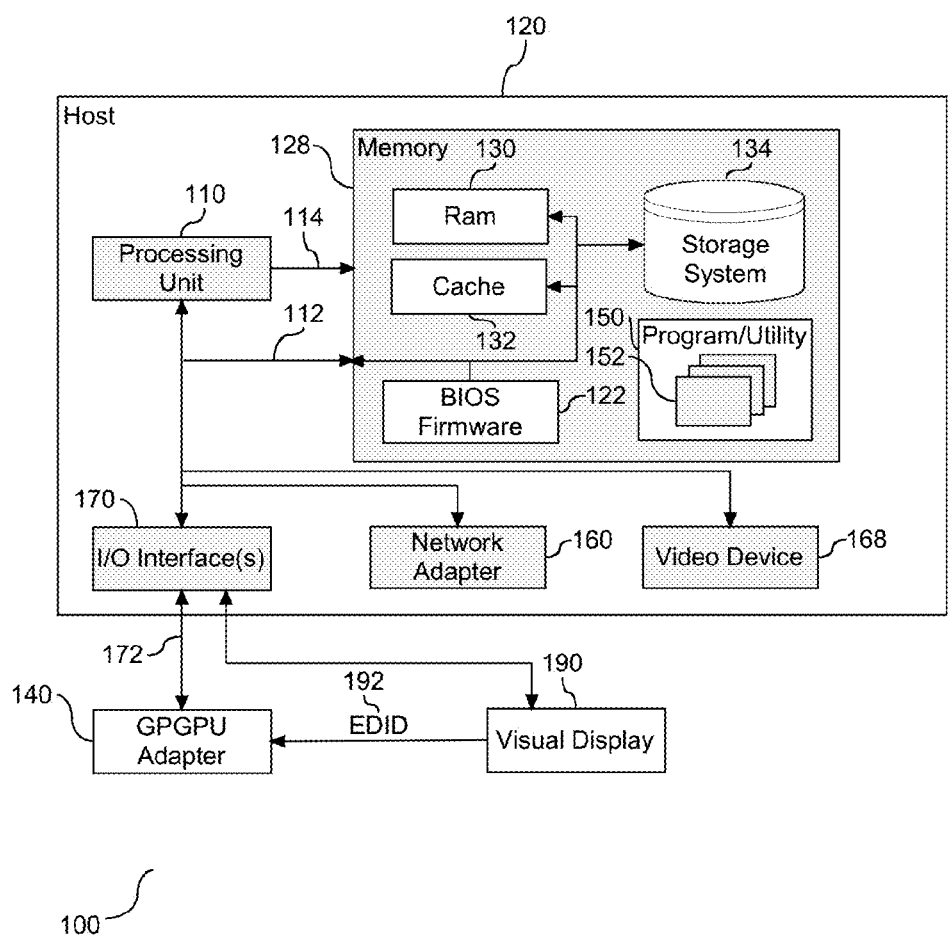
FIG. 1 depicts a block diagram illustrating a computer system for controlling the function of a GPGPU adapter in accordance with an embodiment.

With reference to FIG. 1, a block diagram (100) is provided illustrating an exemplary system for controlling the function of a GPGPU adapter. The system (100) includes a computer system or server (120), also referred to herein as a host. As shown, a GPGPU adapter is provided in communication with the host (120). The GPGPU adapter (140) in the first mode functions to enhance video output to the visual display (190).

The components of the host (120) include one or more processors, such as a processing unit (110), a system memory (128), and a bus (112) that couples various system components including system memory (128) to processing unit (110). As shown, processing unit (110) is operatively coupled to system memory (128) via bus (112). In addition, the processing unit (110) is operatively coupled to system memory via a memory bus (114), parallel to bus (112). More specifically, bus (112) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Enhanced ISA (EISA) bus, Micro Channel Architecture (MCA) bus, Video Electronics Standards Association (VESA) local bus, and Peripheral Component Interconnect (PCI) bus. Host (120) typically includes a variety of computer system readable media. Such media may be any available media that is accessible by the host (120), and includes both volatile and non-volatile media, and removable and non-removable media.

Memory (128) is shown as a grouping or collection of one or more volatile or persistent memory components. By way of example, and as shown in FIG. 1, memory (128) may include random access memory (RAM) (130), cache memory (132), a persistent storage system (134), and a program/utility (150). In one embodiment, the persistent storage system (134) may be located remote from the host (120), such as a remote data center. By way of example only, persistent storage system (134) can be provided for reading from and writing to a non-removable, non-volatile magnetic medium, typically called a "hard drive" (not shown). Although not shown, a magnetic disk drive for reading from and writing to a removable, non-volatile magnetic disk (e.g., a "floppy disk"), and an optical disk drive for reading from or writing to a removable, non-volatile optical disk (e.g., a CD-ROM) can be provided. In such instances, each of these devices can be connected to the bus (112) by one or more data media interfaces. It is to be understood that the components of the memory (128) may be arranged as individual components, embodied in a single apparatus, or arranged in any combination thereof.

Program/utility (150) is shown herein embedded in memory (128). The program/utility (150) has a set of one or more stored program modules (152). Such program modules (152) may include, but are not limited to, an operating system, one or more application programs, other program modules, and program data. Each of the operating system, one or more application programs, other program modules, and program data or some combination thereof, may include an implementation of a networking environment. Program modules (152) generally carry out the functions and methodologies of embodiments of the invention as described herein.

Basic input/output system (BIOS) firmware (122), hereinafter referred to as a BIOS, is provided in communication with the processing unit (110). BIOS is a set of computer instructions stored in memory that enables a computer to start the operating system and to communicate with various devices in the system, including, but not limited to, a keyboard, visual display, persistent storage, serial communication(s), adapters, etc. In one embodiment, the BIOS (122) is stored on a non-volatile memory device in communication with memory (128) to ensure that the BIOS will always be available and not subject to damage associated with disk failure. Examples of such non-volatile memory devices include, but are not limited to, read-only memory (ROM), erasable programmable read-only memory (EPROM), flash memory, etc. In one embodiment, the BIOS (122) is a microcontroller embedded in, or is otherwise in communication with a printed circuit board (PCB).

As shown, host (120) is provided with one or more I/O interfaces, including an I/O interface (170). As is known in the art, the I/O interface (170) allows for the host (120) to communicate with external devices. As shown, the I/O interface (170) is operatively coupled to the processing unit (110), the I/O interface (170) is in communication with the GPGPU adapter (140) via a communication bus (172). The I/O interface (170) is also in communication with visual display (190). As depicted in FIG. 1, the communication bus (172) may be a PCIe bus. It is to be appreciated that the communication bus is not limited to a PCIe bus, but may be any type of communication bus that can transfer data between the I/O interface (170) and the GPGPU (140) in accordance with the embodiments described herein. Various types of such communication buses are known by those having ordinary skill in the art, and thus will not be discussed in further detail.

Video device (168) is provided in communication with the processing unit (110) and is configured to output video data. In one embodiment, video device (168) is an application-specific integrated circuit (ASIC) designed to output video data.

As shown in FIG. 1, visual display (190) is in communication with both the GPGPU adapter (140) and a third terminal of the I/O interface (170). In one embodiment, the visual display (190) provides extended display identification data (EDID) (192) to GPGPU adapter (140). The visual display (190) is configured to display graphics from the video data output of either the GPGPU adapter (140) or the video device (168). The source of the video data output is determined by the operating mode of the GPGPU adapter (140). More specifically, the GPGPU adapter (140) includes at least two modes of operation, including a first mode and a second mode. The first mode is referred to herein as a graphics mode and the second mode is referred to herein as a computational mode. While the GPGPU adapter (140) is operating in the graphics mode, the visual display (190) receives video data output from the GPGPU adapter (140), and while the GPGPU adapter (140) is operating in the computational mode, the visual display (190) receives video data output from the video device (168). Accordingly, the visual display (190) receives video data from one of two different sources depending on the operating mode of the GPGPU adapter (140).

The system (100) depicted in FIG. 1 is configured to automatically set the operating mode of the GPGPU adapter (140). A method implemented by the system (100) to automatically set the operating mode of GPGPU adapter (140) is described below, with reference to FIG. 2.

As shown in FIG. 1, the host (120) may also include a network adapter (160). As depicted, the network adapter (160) communicates with the other components of host (120) via a bus (162). The network adapter (160) allows the components of the host (120) to communicate with one or more networks, including but not limited to a local area network (LAN), a wide area network (WAN), a private network (e.g., an intranet), or a public network (e.g., the Internet). Examples of network adapters include, but are not limited to, an Ethernet card, a wireless network adapter (e.g., a Wi-Fi adapter), etc. Data transferred via network adapter (160) is in the form of one or more signals which may be, for example, electronic, electromagnetic, optical, etc. The data is transferred via a communication path (i.e., channel). This communications path carries signals and may be implemented using wire or cable, fiber optics, a phone line, a cellular phone link, a radio frequency (RF) link, any other communication channels, or any combination of the foregoing.

It should be understood that although not shown, other hardware and/or software components could be used in conjunction with host (120). Examples, include, but are not limited to: microcode, device drivers, redundant processing units, external disk drive arrays, redundant array of inexpensive disks (RAID) systems, tape drives, data archival storage systems, etc.

The system (100) described above in FIG. 1 has been labeled with tools in the form of components that are provided to automatically set the operating mode of a GPGPU adapter. The tools may be implemented in programmable hardware devices such as field programmable gate arrays, programmable array logic, programmable logic devices, or the like. The tools may also be implemented in software for execution by various types of processors. An identified functional unit of executable code may, for instance, comprise one or more physical or logical blocks of computer instructions which may, for instance, be organized as an object, procedure, function, or other construct. Nevertheless, the executable code of the tools need not be physically located together, but may comprise disparate instructions stored in different locations which, when joined logically together, comprise the tools and achieve the stated purpose of the tools.

Indeed, executable code could be a single instruction, or many instructions, and may even be distributed over several different code segments, among different applications, and across several memory devices. Similarly, operational data may be identified and illustrated herein within the tool and may be embodied in any suitable form and organized within any suitable type of data structure. The operational data may be collected as a single data set, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of the embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of the embodiments.

Figure 2:
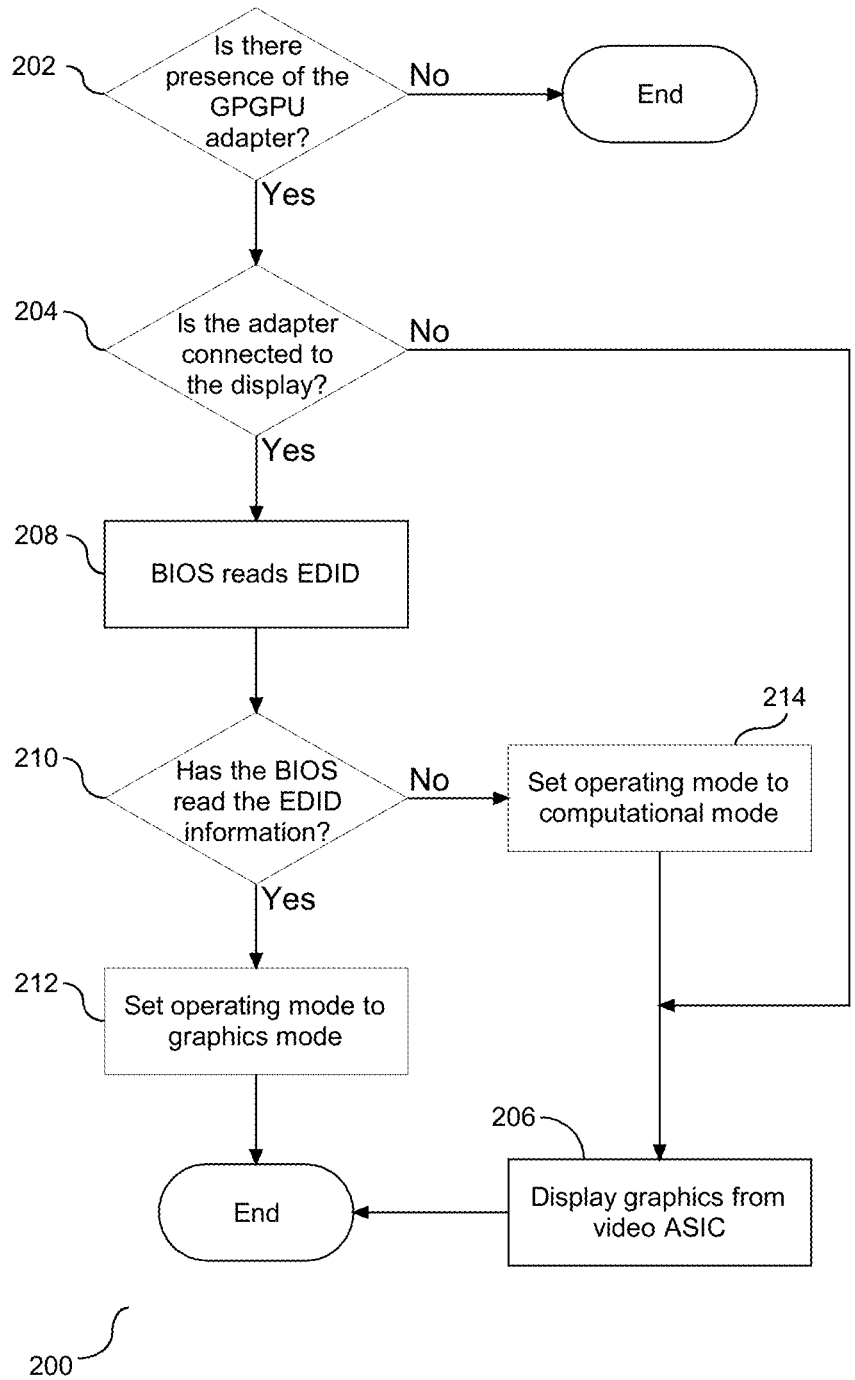
FIG. 2 depicts a flow chart illustrating a process for controlling the function of a GPGPU adapter in accordance with an embodiment.

With reference now to FIG. 2, a flow chart (200) illustrating a method for controlling the function of the GPGPU adapter, as shown and described in FIG. 1, is depicted. The presence of the GPGPU adapter is determined by the BIOS of a computer system or server (i.e., host) (202). This aspect may include scanning a communication bus for the presence of the GPGPU adapter in communication with the communication bus. In one embodiment, the communication bus is a PCIe bus. It is to be understood that the embodiments are not limited to a PCIe bus. Other types of communication buses known to those having ordinary skill in the art may be used instead, the details of which will not be described herein.

A positive response to the determination at step (202) is followed by interrogation of the adapter to determine whether the adapter is in communication with a visual display (204). However, a negative response to the determination at step (202) ends the process for controlling the function of the GPGPU adapter as no such adapter is detected by the BIOS. The positive response to the determination at step (204) is followed by the BIOS reading extended display identification data (EDID) provided by the visual display (208). In one embodiment, the EDID is encoded with information corresponding to the display capabilities of the visual display. Information encoded within the EDID may include, but is not limited to, resolution data, scan rate, and display size associated with the capabilities of the visual display.

The GPGPU adapter may operate in multiple modes, including a first mode and a second mode. In one embodiment, the first mode of the GPGPU adapter is also referred to as a graphics mode to output video data at a high resolution to provide enhanced viewing of the graphics, and the second mode of the GPGPU adapter is also referred to as a computational mode to accelerate mathematical operations while limiting the enhanced viewing of the graphics. In the graphics mode, the GPGPU adapter has limited computational capabilities. Similarly, in the computational mode, the GPGPU adapter has limited graphics capabilities.

The GPGPU adapter is automatically set to an operating mode, with the setting based on the result of the read at step (208). In one embodiment, automatically setting the GPGPU adapter to an operating mode includes the BIOS automatically re-initializing the GPGPU adapter. More specifically, to ensure the reading has taken place, at step (210) it is determined if the BIOS has read the EDID information. As shown, a positive response to the determination at step (210) is followed by the BIOS automatically setting the operating mode of the GPGPU adapter to the graphics mode (212). In one embodiment, the resolution of the video data output while the GPGPU adapter is in the graphics mode is determined by the EDID information provided by the visual display. In one embodiment, setting the GPGPU adapter to the graphics mode causes the BIOS to disable the video ASIC. A negative response to the determination at step (210) is followed by the BIOS setting the operating mode of the GPGPU adapter to the computational mode (214). While in the computational mode, the GPGPU adapter utilizes its computational power to accelerate the performance of mathematical operations. Such mathematical operations include, for example, arithmetic calculations.

Following step (214) or following a negative response to the determination at step (204) leads to the assumption that a GPGPU adapter is not going to be used in the graphics mode. This assumption is based on the determination that a GPGPU adapter is not detected, or that the BIOS was unable to read the EDID information. In either case, the result is the outputting of video data associated with the video ASIC (206) to display graphics. The resolution of the video data output associated with the video ASIC may be viewed as the "default" resolution of the host. In one embodiment, the video data output by the video ASIC is at a lower resolution than the video data output by the GPGPU adapter in the graphics mode.

The method shown and described in FIG. 2 may be embodied as a computer implemented method to control the function of the GPGPU adapter, and more specifically to control the setting of the operating mode of the GPGPU adapter. The embodiments described herein may be embodied in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart(s) and block diagram(s) in the Figures illustrate the architecture, functionality, and operation of possible implementations of systems, methods, and computer program products according to various embodiments of the present invention. In this regard, each block in the flowchart or block diagram may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments provided herein has been presented for purposes of illustration and description, but is not intended to be exhaustive or limited to the invention in the form disclosed. Many modifications and variations will be apparent to those of ordinary skill in the art without departing from the scope and spirit of the embodiments. The embodiments were chosen and described in order to best explain the principles of the embodiments and the practical application, and to enable others of ordinary skill in the art to understand the various embodiments with various modifications as are suited to the particular use contemplated. In particular, the embodiments were chosen and described in order to enable one skilled in the art to automatically set an operating mode of the GPGPU adapter.

It will be appreciated that, although specific embodiments have been described herein for purposes of illustration, various modifications may be made without departing from the spirit and scope of the embodiments. Accordingly, the scope of protection of this invention is limited only by the following claims and their equivalents.

What is claimed is:

1. A system comprising:
   a computer system comprising a processing unit operatively coupled to memory, a video device for outputting video data, and a basic input/output system (BIOS);
   a general-purpose computing on graphics processing unit (GPGPU) adapter;
   a visual display; and
   a tool in communication with the processing unit to control the function of the GPGPU adapter, the tool comprising:
      an input/output (I/O) interface operatively coupled to the processing unit, wherein the GPGPU adapter and the visual display are in communication with the I/O interface, wherein the GPGPU adapter is in communication with the I/O interface via a communication bus; and
      the BIOS to determine presence of the GPGPU adapter;
      the BIOS to interrogate the GPGPU adapter based on the determined presence, including determining communication between the visual display and the GPGPU adapter;
      the BIOS to automatically set an operating mode of the GPGPU adapter based on the determined communication wherein the GPGPU adapter is set to the first mode in response to determining that the GPGPU adapter is in communication with the visual display and automatically set to the second mode if the GPGPU adapter is not in communication with the visual display; and
   wherein the first mode of the GPGPU adapter is a graphics mode to operate at a first resolution, and the second mode of the GPGPU adapter is a computational mode to operate at a second resolution wherein the first resolution is directed at video data and the second resolution is directed at computational data, wherein the first resolution is different than the second resolution.

2. The system of claim 1, further comprising the BIOS to automatically re-initialize the GPGPU adapter to operate in the first mode following reading of extended display identification data (EDID) information provided to the BIOS by the visual display via the GPGPU adapter.

3. The system of claim 2, further comprising the GPGPU adapter to output video at the first resolution from the GPGPU adapter, and the BIOS to disable the video device.

4. The system of claim 3, wherein the video device is a video application-specific integrated circuit (ASIC).

5. The system of claim 1, further comprising the BIOS setting the GPGPU adapter to the second mode in response to determining that the GPGPU adapter is not in communication with the visual display.

6. The system of claim 5, further comprising, in response to the GPGPU adapter being set to the second mode, the video device to output video data and the GPGPU adapter performing computations.

7. The system of claim 5, wherein setting the GPGPU adapter to the second mode includes the BIOS to automatically re-initialize the GPGPU adapter to operate in the second mode.

8. The system of claim 1, wherein the communication bus is a PCIe bus.

9. The system of claim 1, further comprising the BIOS to automatically set an operating mode of the GPGPU adapter during the initialization of an operating system.

10. The system of claim 2, wherein the video device is in communication with the visual display.

11. A method comprising:
    determining, by a basic input/output system (BIOS) operatively coupled to an operating system, presence of a general-purpose computing on graphics processing unit (GPGPU) adapter;
    interrogating, by the BIOS, the GPGPU adapter, including determining communication between the GPGPU adapter and a visual display; and
    automatically setting, by the BIOS, an operating mode of the GPGPU adapter based on the determined communication;
    wherein the GPGPU adapter is set to the first mode in response to determining that the GPGPU adapter is in communication with the visual display and automatically set to the second mode if the GPGPU adapter is not in communication with the visual display: and
    wherein the first mode of the GPGPU adapter is a graphics mode to operate at a first resolution, and the second mode of the GPGPU adapter is a computational mode to operate at a second resolution wherein the first resolution is directed at video data and the second resolution is directed at computational data, wherein the first resolution is different than the second resolution.

12. The method of claim 11, further comprising the BIOS automatically re-initializing the GPGPU adapter to operate in the first mode following reading of extended display identification data (EDID) information provided by the visual display.

13. The method of claim 12, further comprising outputting video at the first resolution from the GPGPU adapter, and the BIOS disabling a video device for outputting video data.

14. The method of claim 11, wherein setting the GPGPU adapter to the second mode includes the BIOS automatically re-initializing the GPGPU adapter to operate in the second mode.

15. The method of claim 14, further comprising outputting video associated with the video device, and using the GPGPU adapter to perform computations.

16. A computer program product for controlling a function of a general-purpose computing on graphics processing unit (GPGPU) adapter, the computer program product comprising a computer readable storage device having program code embodied therewith, the program code executable by a processing unit to:
- determine, by a basic input/output system (BIOS) operatively coupled to an operating system, presence of a general-purpose computing on graphics processing unit (GPGPU) adapter;
- Interrogate the GPGPU adapter, by the BIOS, including determine communication between the GPGPU adapter and a visual display;
- sending by the BIOS, video data to the visual display, including:
  - automatically set by the BIOS, an operating mode of the GPGPU adapter based on the determined communication;
  - wherein the GPGPU adapter is set to the first mode in response to determining that the GPGPU adapter is in communication with the visual display, including the GPGPU adapter to send the video data to the visual display, and
- wherein the GPGPU adapter is automatically set to the second mode in response to determining that the GPGPU adapter is not in communication with the visual display including a video device to send the video data to the visual display; and
- wherein the first mode of the GPGPU adapter is a graphics mode to operate at a first resolution, and the second mode of the GPGPU adapter is a computational mode to operate at a second resolution wherein the first resolution is directed at video data and the second resolution is directed at computational data, wherein the first resolution is different than the second resolution.

17. The method of claim 16, further comprising the BIOS automatically re-initializing the GPGPU adapter to operate in the first mode following reading of extended display identification data (EDID) information provided by the visual display.

18. The method of claim 17, further comprising outputting video at the first resolution from the GPGPU adapter, and the BIOS disabling the video device for outputting video data.

19. The method of claim 16, wherein setting the GPGPU adapter to the second mode includes the BIOS automatically re-initializing the GPGPU adapter to operate in the second mode.

20. The method of claim 18, wherein the visual display is in communication with the video device.

* * * * *